US012573796B2

(12) United States Patent
Long et al.

(10) Patent No.: US 12,573,796 B2
(45) Date of Patent: Mar. 10, 2026

(54) RECEPTACLE CAGE HAVING EMI SHIELDING

(71) Applicant: TE Connectivity Solutions GmbH, Schaffhausen (CH)

(72) Inventors: Richard James Long, Columbia, PA (US); Alex Michael Sharf, Harrisburg, PA (US); Freddy R. Galindo Palomino, Harrisburg, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 589 days.

(21) Appl. No.: 18/076,593

(22) Filed: Dec. 7, 2022

(65) Prior Publication Data

US 2024/0195130 A1 Jun. 13, 2024

(51) Int. Cl.
*H01R 13/6596* (2011.01)
*H01R 13/6581* (2011.01)

(52) U.S. Cl.
CPC ..... *H01R 13/6596* (2013.01); *H01R 13/6581* (2013.01)

(58) Field of Classification Search
CPC ........................ H01R 13/6596; H01R 13/6581
USPC ........................................................ 439/607.2
See application file for complete search history.

(56) References Cited

U.S. PATENT DOCUMENTS 6,368,153 B1 * 4/2002 Hwang .............. H01R 13/6594 439/607.2
6,416,361 B1 * 7/2002 Hwang .............. H01R 13/6582 439/607.2
6,478,622 B1 * 11/2002 Hwang .............. H01R 13/6596 439/607.2
6,508,670 B1 * 1/2003 Hwang .............. H01R 13/6594 439/607.37
6,524,134 B2 * 2/2003 Flickinger ............ H05K 9/0058 439/607.2
7,530,845 B1 * 5/2009 Yang .................... G02B 6/4201 439/607.01
7,557,306 B2 * 7/2009 Chen .................... H05K 9/0058 174/382
7,758,381 B2 * 7/2010 Oki .................... H01R 13/6582 439/607.17
7,857,662 B2 * 12/2010 Gillespie .............. H01R 13/658 439/607.2
7,869,224 B1 * 1/2011 Yang .................... G02B 6/4277 361/728
8,033,741 B2 * 10/2011 Yoshikawa .......... G02B 6/4246 439/607.2

(Continued)

FOREIGN PATENT DOCUMENTS

CN 211958037 U * 11/2020

*Primary Examiner* — Peter G Leigh

(57) ABSTRACT

A receptacle connector assembly includes a receptacle cage having shielding walls including a top wall, a first side wall, and a second side wall forming a module channel configured to receive a pluggable module. The receptacle connector assembly includes an EMI shield coupled to the receptacle cage at the front end having a shield member that includes a base coupled to at least one of the shielding walls to electrically connect the EMI shield to the receptacle cage and shield fingers extending from the base to distal ends. The receptacle connector assembly includes a shield finger shroud extending from the receptacle cage having a pocket to receive the distal end of the corresponding shield finger.

20 Claims, 4 Drawing Sheets

(56) References Cited

U.S. PATENT DOCUMENTS

| | | | | |
|---|---|---|---|---|
| 8,622,770 B2* | 1/2014 | Teo | G02B 6/4277 | 439/607.2 |
| 8,747,159 B2* | 6/2014 | Liu | G02B 6/4261 | 439/607.2 |
| 9,413,115 B1* | 8/2016 | Henry | H01R 13/6582 | |
| 2007/0128937 A1* | 6/2007 | Long | H01R 13/6584 | 439/607.01 |
| 2010/0079971 A1* | 4/2010 | Gillespie | H01R 13/658 | 361/816 |
| 2013/0048367 A1* | 2/2013 | Ljubijankic | H01R 13/6583 | 174/354 |
| 2022/0344874 A1* | 10/2022 | Yang | H01R 13/6581 | |

* cited by examiner

RECEPTACLE CAGE HAVING EMI SHIELDING

BACKGROUND OF THE INVENTION

The subject matter herein relates generally to communication systems.

Some communication systems utilize communication connectors to interconnect various components of the system for data communication. Some known communication systems use pluggable modules, such as I/O modules, which are electrically connected to the communication connector. Known communication systems provide electrical shielding, such as in the form of a receptacle cage surrounding the communication connector and the pluggable module to provide electrical shielding. Some receptacle cages provide an EMI shield at the front end of the receptacle cage including EMI springs for interfacing with a panel or other grounding structure. However, the EMI springs make poor contact with the receptacle cage, such as due to manufacturing tolerances or over-bending of the EMI springs prior to or during assembly. The poor contact leads to a diminished performance.

A need remains for a receptacle cage having improved EMI shielding.

BRIEF DESCRIPTION OF THE INVENTION

In one embodiment, a receptacle connector assembly is provided and includes a receptacle cage having shielding walls extending between a front end and a rear end of the receptacle cage. The shielding walls include a top wall, a first side wall extending from the top wall to a bottom of the receptacle cage, and a second side wall extending from the top wall opposite the first side wall to the bottom of the receptacle cage. The top wall, the first side wall and the second side wall form a module channel configured to receive a pluggable module. The front end has a port open to the pluggable module to receive the pluggable module. The receptacle connector assembly includes an EMI shield coupled to the receptacle cage at the front end. The EMI shield has a shield member that includes a base coupled to at least one of the shielding walls to electrically connect the EMI shield to the receptacle cage. The shield member includes shield fingers extending from the base to distal ends. The receptacle connector assembly includes a shield finger shroud extending from the receptacle cage. The shield finger shroud includes a pocket to receive the distal end of the corresponding shield finger.

In another embodiment, a receptacle connector assembly is provided and includes a receptacle cage having shielding walls extending between a front end and a rear end of the receptacle cage. The shielding walls include a top wall, a first side wall extending from the top wall to a bottom of the receptacle cage, and a second side wall extending from the top wall opposite the first side wall to the bottom of the receptacle cage. The top wall, the first side wall and the second side wall form a module channel configured to receive a pluggable module. The front end has a port open to the pluggable module to receive the pluggable module. The receptacle connector assembly includes an EMI shield coupled to the receptacle cage at the front end. The EMI shield has a shield member that includes a base coupled to at least one of the shielding walls to electrically connect the EMI shield to the receptacle cage. The shield member includes shield fingers extending from the base to distal ends. The receptacle connector assembly includes a shield finger shroud extending from the receptacle cage. The shield finger shroud includes shroud walls to form a pocket. The shroud walls include a base shroud wall coupled to the receptacle cage and a pocket shroud wall forming the pocket. The pocket shroud wall is fixed at a first distance from the receptacle cage to form the pocket therebetween. The pocket receives the distal end of the corresponding shield finger.

In a further embodiment, a receptacle connector assembly is provided and includes a receptacle cage having shielding walls extending between a front end and a rear end of the receptacle cage. The shielding walls include a top wall, a first side wall extending from the top wall to a bottom of the receptacle cage, and a second side wall extending from the top wall opposite the first side wall to the bottom of the receptacle cage. The top wall, the first side wall and the second side wall form a module channel configured to receive a pluggable module. The front end has a port open to the pluggable module to receive the pluggable module. The receptacle connector assembly includes an EMI shield coupled to the receptacle cage at the front end. The EMI shield has a shield member that includes a base coupled to at least one of the shielding walls to electrically connect the EMI shield to the receptacle cage. The shield member includes shield fingers extending from the base to distal ends. The receptacle connector assembly includes a shield finger shroud extending from the receptacle cage. The shield finger shroud includes shroud walls that form a pocket to receive the distal end of the corresponding shield finger. The shroud walls include a base shroud wall coupled to the receptacle cage and a pocket shroud wall forming the pocket. The pocket shroud wall is spring biased toward the receptacle cage. The pocket shroud wall engages the corresponding at least one of the shield fingers to press the distal end of the corresponding at least one of the shield fingers into engagement with the receptacle cage.

DETAILED DESCRIPTION OF THE INVENTION

Figure 1:
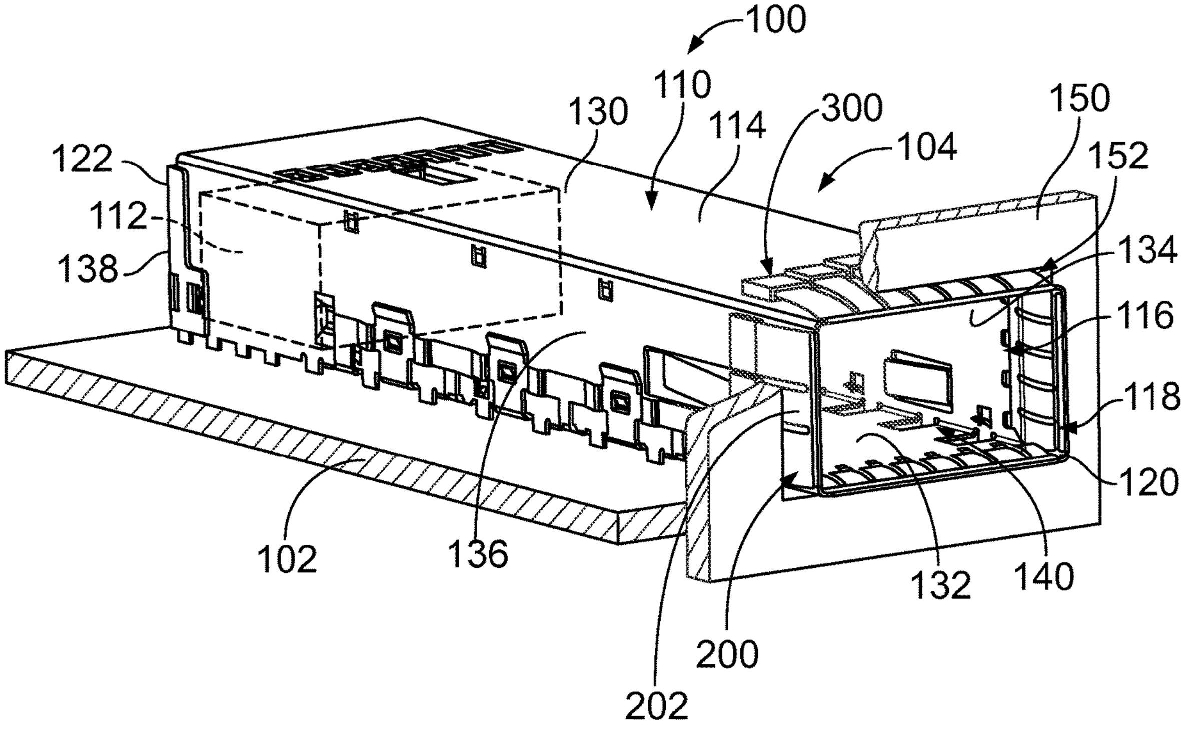
FIG. 1 is a front perspective view of a communication system formed in accordance with an exemplary embodiment.

FIG. 1 is a front perspective view of a communication system 100 formed in accordance with an exemplary embodiment. The communication system 100 includes a host circuit board 102 and a receptacle connector assembly 104 mounted to the host circuit board 102. The receptacle connector assembly 104 is configured to receive a pluggable module 106 (example shown in FIG. 2). The receptacle connector assembly 104 is configured to be electrically connected to the host circuit board 102 by the receptacle connector assembly 104.

In an exemplary embodiment, the receptacle connector assembly 104 includes a receptacle cage 110 and a communication connector 112 (shown in phantom) adjacent the receptacle cage 110. The communication connector 112 may be received in the receptacle cage 110. In other various embodiments, the communication connector 112 may be located rearward of the receptacle cage 110. In various embodiments, the receptacle cage 110 is enclosed and provides electrical shielding for the communication connector 112. In an exemplary embodiment, the receptacle cage 110 is a stamped and formed cage member that includes a plurality of shielding walls 114 that define one or more module channels for receipt of corresponding pluggable modules 106.

In the illustrated embodiment, the receptacle cage 110 is a single port receptacle cage configured to receive a single pluggable module 106. In other various embodiments, the receptacle cage 110 may be a ganged cage member having a plurality of ports ganged together in a single row and/or a stacked cage member having multiple ports stacked as an upper port and a lower port.

The receptacle cage 110 includes a module channel 116 having a module port 118 open to the module channel 116. The module channel 116 receives the pluggable module 106 through the module port 118. In an exemplary embodiment, the receptacle cage 110 extends between a front end 120 and a rear end 122. The module port 118 is provided at the front end 120. Any number of module channels 116 may be provided in various embodiments arranged in a single column or in multiple columns (for example, 2×2, 3×2, 4×2, 4×3, 4×1, 2×1, and the like). Optionally, multiple communication connectors 112 may be arranged within the receptacle cage 110, such as when multiple rows and/or columns of module channels 116 are provided.

In an exemplary embodiment, the shielding walls 114 of the receptacle cage 110 include a first end wall 130, a second end wall 132, a first side wall 134, and a second side wall 136. The side walls 134, 136 extend between the end walls 130, 132. In various embodiments, the first end wall 130 is at a top of the receptacle cage 110, and thus defines a top wall 130, and the second end wall 132 is at a bottom of the receptacle cage 110, and thus defines a bottom wall 132. Other orientations are possible in alternative embodiments, such as the second end wall 132 or one of the side walls 134, 136 defining the top wall. The bottom wall 132 may face, and possibly rest on, the host circuit board 102. In various embodiments, the receptacle cage 110 may be provided without the bottom wall 132. Optionally, the walls 114 of the receptacle cage 110 may include a rear wall 138 at the rear end 122.

The shielding walls 114 define a cavity 140. For example, the cavity 140 may be defined by the first end wall 130, the second end wall 132, the side walls 134, 136 and the rear wall 138. The cavity 140 includes the module channel 116. In various embodiments, the cavity 140 receives the communication connector 112, such as at the rear end 122. Other walls 114 may separate or divide the cavity 140 into additional module channels 116, such as in embodiments using ganged and/or stacked receptacle cages. For example, the walls 114 may include one or more vertical divider walls between ganged module channels 116. In various embodiments, the walls 114 may include a separator panel between stacked upper and lower module channels 116. The separator panel may include an upper panel and a lower panel that form a space between the upper and lower module channels 116, such as for airflow, for a heat sink, for routing light pipes, or for other purposes.

In an exemplary embodiment, the receptacle connector assembly 104 includes an EMI shield 200 at the front end 120 for providing electrical shielding for the module channels 116. For example, the EMI shield 200 may be provided at the port 118 to electrically connect with the pluggable module 106 received in the module channel 116. In an exemplary embodiment, the EMI shield 200 is provided around the exterior of the receptacle cage 110 for interfacing with a panel 150, such as when the front end 120 of the receptacle cage 110 extends through a cutout 152 in the panel 150. The EMI shield 200 may include shield fingers to provide EMI shielding. In various embodiments, the shield fingers are deflectable features that are configured to be spring biased against the panel 150 to create an electrical connection with the panel 150. The shield fingers may be spring biased against the pluggable module 106 to create an electrical connection with the pluggable module 106.

The EMI shield 200 includes shield members 202 extending along the shielding walls 114. In various embodiments, the shield members 202 are separate and discrete shield members 202 provided on the corresponding shielding walls 114. In other various embodiments, the shield members 202 are integrated as a unitary structure (for example, along three sides or all four sides of the receptacle cage 110) with different segments extending along the corresponding shielding walls 114.

In an exemplary embodiment, the receptacle connector assembly 104 includes one or more shield finger shrouds 300 extending from the receptacle cage 110. Each shield finger shrouds 300 is configured to receive a corresponding portion of the EMI shield 200. For example, the shield finger shrouds 300 receive ends of the shield fingers of the EMI shield 200. The shield finger shrouds 300 capture the ends of the shield fingers to electrically connect the shield fingers to the receptacle cage 110. The shield finger shrouds 300 may press the ends of the shield fingers into the receptacle cage 110 to ensure electrical connection between the shield fingers of the EMI shield 200 and the receptacle cage 110. Optionally, the shield finger shrouds 300 may be electrically conductive and provide an electrical path between the shield fingers of the EMI shield 200 and the receptacle cage 110. In the illustrated embodiment, a plurality of the shield finger shrouds 300 are provided each receiving a corresponding end of the corresponding shield finger. However, in alternative embodiments, each shield finger shrouds 300 may receive a plurality of the shield fingers. In other various embodiments, a single shield finger shroud 300 is provided receiving the ends of all of the shield fingers. In various embodiments, the shield finger shrouds 300 form pockets that receive the ends of the shield fingers. The pockets are located outward of the cage walls 114 to receive the shield fingers. The shield finger shrouds 300 may enclose or surround the ends of the shield fingers, such as along both edges and the outer surface of the shield finger. In other various embodiments, the shield finger shrouds 300 may cover the ends of the shield fingers along a single side, such as the outer surface of the shield finger rather than along all sides.

Optionally, the receptacle connector assembly 104 may include one or more heat sinks (not shown) for dissipating heat from the pluggable modules 106. For example, the heat sink may be coupled to the top wall 130 for engaging the pluggable module 106 received in the module channel 116. The heat sink may extend through an opening in the top wall 130 to directly engage the pluggable module 106. Other types of heat sinks may be provided in alternative embodiments.

In an exemplary embodiment, the pluggable modules 106 are loaded through the port 118 at the front end 120 to mate with the communication connector 112. The shielding walls 114 of the receptacle cage 110 provide electrical shielding around the communication connector 112 and the pluggable module 106, such as around the mating interface between the communication connector 112 and the pluggable module 106.

Figure 2:
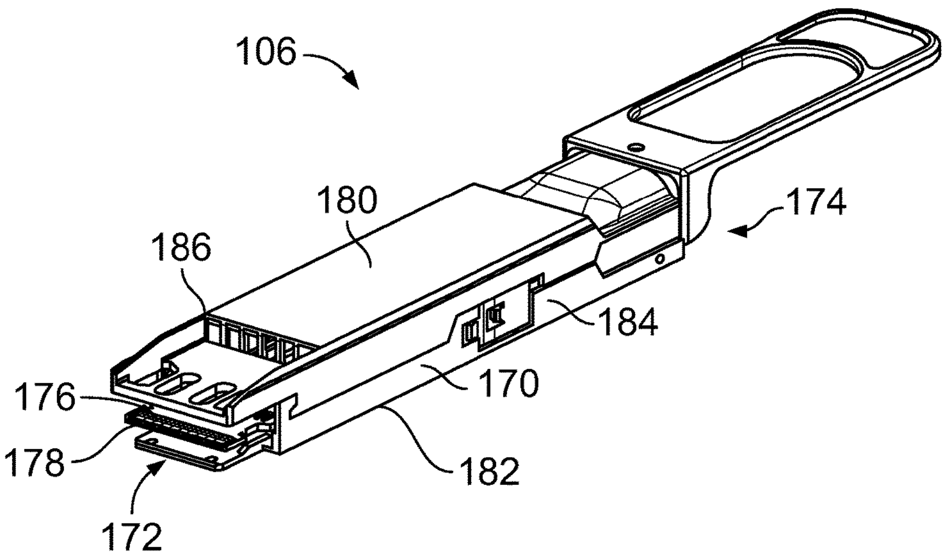
FIG. 2 is a perspective view of the pluggable module in accordance with an exemplary embodiment.

FIG. 2 is a perspective view of the pluggable module 106 in accordance with an exemplary embodiment. The pluggable module 106 has a pluggable body 170, which may be defined by one or more shells. The pluggable body 170 may be thermally conductive and/or may be electrically conductive, such as to provide EMI shielding for the pluggable module 106. The pluggable body 170 includes a mating end 172 and an opposite front end 174. The mating end 172 is configured to be inserted into the corresponding module channel 116 (shown in FIG. 1). The front end 174 may be a cable end having a cable extending therefrom to another component within the system.

The pluggable module 106 includes a connector interface, such as a module circuit board 176, which is configured to be communicatively coupled to the communication connector 112 (shown in FIG. 1). The module circuit board 176 may be accessible at the mating end 172. The module circuit board 176 has a mating edge 178 and mating contacts at the mating edge 178 configured to be mated with the communication connector 112. The module circuit board 176 may include components, circuits and the like used for operating and/or using the pluggable module 106. For example, the module circuit board 176 may have conductors, traces, pads, electronics, sensors, controllers, switches, inputs, outputs, and the like associated with the module circuit board, which may be mounted to the module circuit board 176, to form various circuits. In various embodiments, the pluggable module 106 may be a fiber optic module. The connector interface(s) may include fiber optic cables and/or optical generators to transmit optical signals.

The pluggable module 106 includes an outer perimeter defining an exterior of the pluggable body 170. For example, the outer perimeter may be defined by a top 180, a bottom 182, a first side 184 and a second side 186. The pluggable body 170 may have other shapes in alternative embodiments. The top 180, the bottom 182, the first side 184 and the second side 186 may have flat surfaces, such as to receive the shield fingers of the EMI shield 200 (shown in FIG. 1).

In an exemplary embodiment, the pluggable body 170 provides heat transfer for the module circuit board 176, such as for the electronic components on the module circuit board 176. For example, the module circuit board 176 is in thermal communication with the pluggable body 170 and the pluggable body 170 transfers heat from the module circuit board 176. Optionally, the pluggable body 170 may include a plurality of heat transfer fins (not shown) along at least a portion of the outer perimeter of the pluggable module 106, such as along the top, for dissipating heat from the pluggable body 170. A plate may connect the distal ends of the heat transfer fins to form a planar, flat surface, such as for interfacing with a heat sink.

Figure 3:
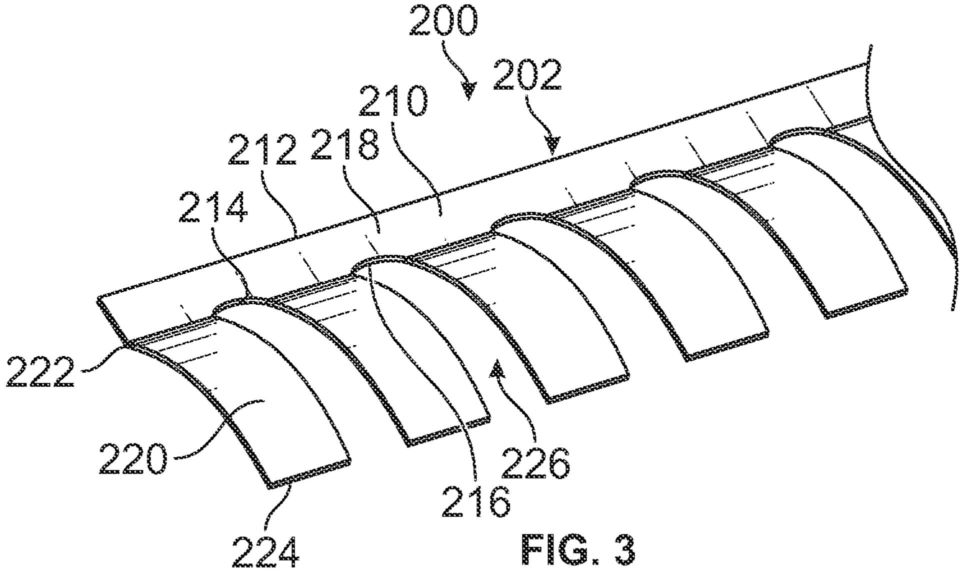
FIG. 3 is a perspective view of a portion of the EMI shield showing a portion of the shield member in accordance with an exemplary embodiment.

FIG. 3 is a perspective view of a portion of the EMI shield 200 showing a portion of the shield member 202 in accordance with an exemplary embodiment. The shield member 202 includes a base 210 and a plurality of shield fingers 220 extending from the base 210.

The base 210 includes a front edge 212 and a rear edge 214. The shield fingers 220 extend rearward from the rear edge 214. The base 210 includes an inner surface 216 and an outer surface 218. The inner surface 216 is configured to be coupled to the receptacle cage 110.

Each shield finger 220 extends between a proximal end 222 and a distal end 224. The proximal end 222 is provided at the base 210. The shield fingers 220 may be curved between the proximal end 222 and the distal end 224. In various embodiments, the shield finger 220 may be deflectable, such as when mating to the receptacle cage 110. For example, the shield finger 220 may be compressed or pressed inward when engaging the panel. In such embodiments, the shield fingers 220 may be spring fingers having spring beams extending between the proximal end 222 and the distal end 224. Gaps 226 are provided between the shield fingers 220 to allow the shield fingers 220 to be independently deflectable.

Figure 4:
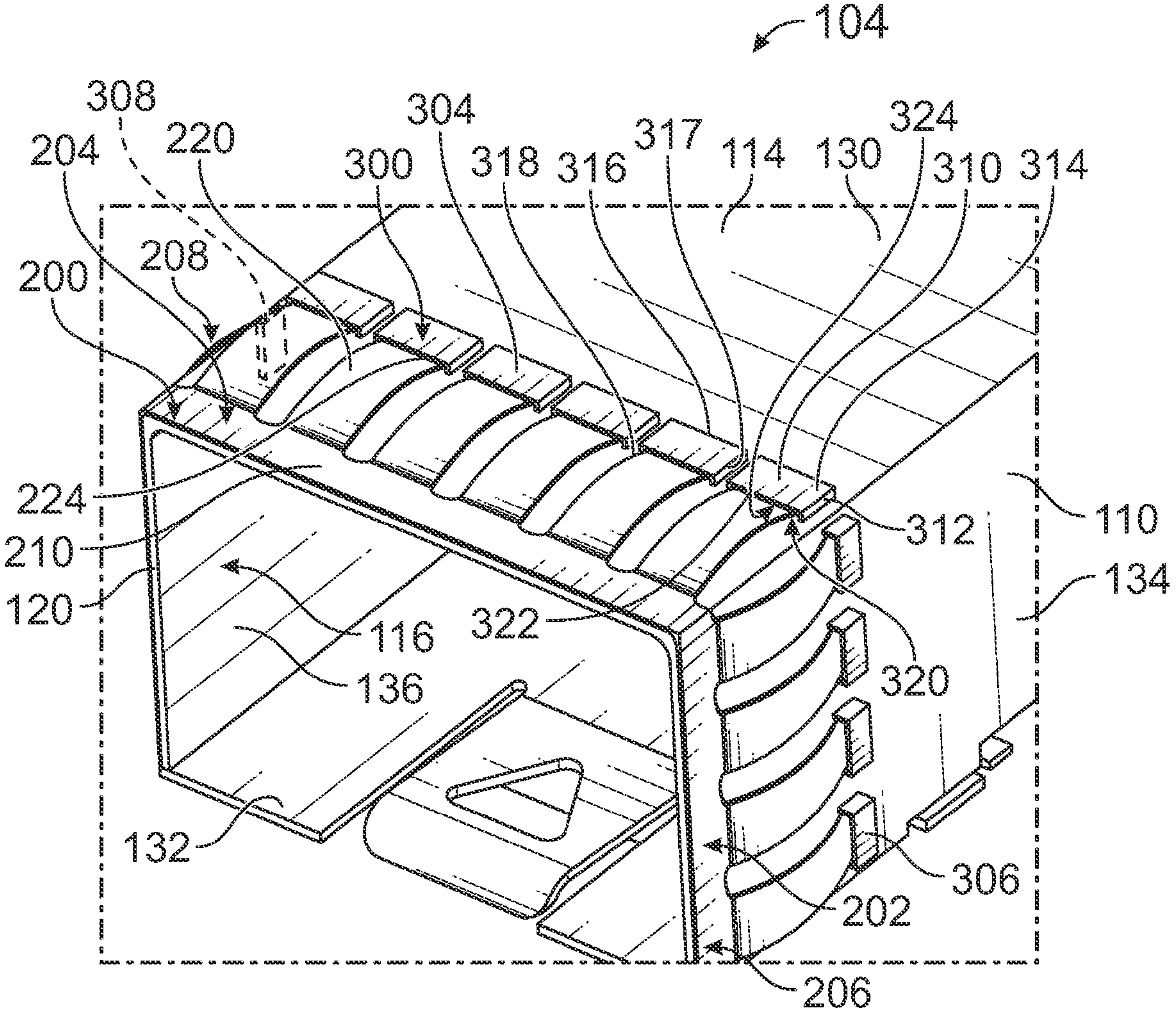
FIG. 4 is a perspective view of a portion of the receptacle connector assembly in accordance with an exemplary embodiment showing the front end of the receptacle cage, the EMI shield, and the shield finger shrouds.
Figure 5:
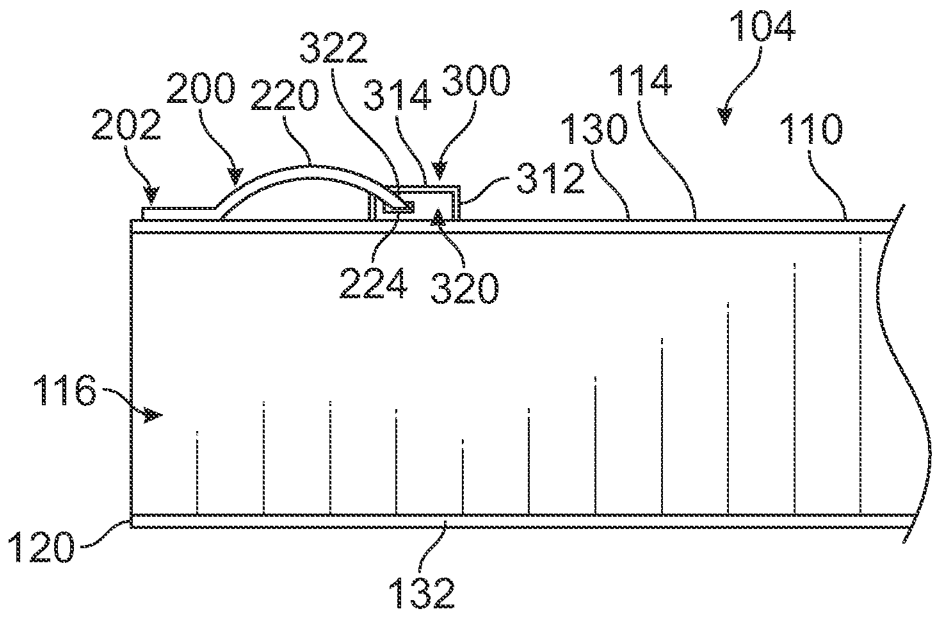
FIG. 5 is a cross sectional view of a front portion of the receptacle connector assembly showing the receptacle cage, the EMI shield, and the shield finger shroud.

FIG. 4 is a perspective view of a portion of the receptacle connector assembly 104 in accordance with an exemplary embodiment showing the front end 120 of the receptacle cage 110, the EMI shield 200, and the shield finger shrouds 300. FIG. 5 is a cross sectional view of a front portion of the receptacle connector assembly 104 showing the receptacle cage 110, the EMI shield 200, and the shield finger shroud 300.

The receptacle cage 110 includes the shielding walls 114 that define the module channel 116. In an exemplary embodiment, the shielding walls 114 include the top wall 130, the bottom wall 132, and the side walls 134, 136. In an exemplary embodiment, the EMI shield 200 includes shield members 202 coupled to the top wall 130 and the side walls 134, 136. Such shield members 202 define an upper shield member 204, a first side shield member 206, and a second side shield member 208, respectively. The EMI shield 200 may additionally include a shield member 202 coupled to the bottom wall 132, which may be referred to as a bottom shield member (not shown). The shield finger shrouds 300 associated with the shield members 204, 206, 208 define upper shield finger shrouds 304, first side shield finger shrouds 306, and second side shield finger shrouds 308 (shown in phantom), respectively. The shield finger shrouds 300 may additionally include bottom shield finger shrouds (not shown) associated with the bottom shield member, when provided. Each shield finger shroud 304, 306, 308 is coupled to the corresponding shield finger 220. However, the shield finger shrouds 304, 306, 308 may be coupled to multiple shield fingers 220 in alternative embodiments. The shield finger shrouds 304, 306, 308 are used to ensure reliable electrical connections between the distal ends 224 of the shield fingers 220 and the receptacle cage 110.

The EMI shield 200 is coupled to the receptacle cage 110. The base 210 of each shield member 202 is coupled to the shielding walls 114. For example, the base 210 may be welded or soldered to the corresponding shielding wall 114. In other embodiments, the base 210 may be clipped or otherwise mechanically and electrically connected to the shielding wall 114. The base 210 may be provided at the front end 120. The shield fingers 220 extend rearward from the base 210 for connection to the corresponding shielding wall 114. The shield fingers 220 define multiple points of contact with the receptacle cage 110 and the shield finger shrouds 300 ensure electrical connection between the distal ends 224 of the shield fingers 220 and the receptacle cage 110.

Each shield finger shroud 300 includes shroud walls 310 forming a pocket 320. The shroud walls 310 may be stamped and formed walls. In various embodiments, the shroud walls 310 are manufactured from a conductive material, such as a metal material. The shroud walls 310 may be electrically connected to the shield finger 220. The distal ends 224 of the shield fingers 220 are received in the corresponding pockets 320. The pocket 320 is open at a front 322 of the shield finger shroud 300 to receive the shield finger 220. In various embodiments, the shroud walls 310 protrude outwardly from the cage walls 114 to locate the pockets 320 outward of the cage walls 114. The cage walls 114 may close the interior sides of the pockets 320.

In an exemplary embodiment, the shroud walls 310 include one or more base shroud wall 312 and one or more pocket shroud wall 314 extending from the base shroud wall(s) 312. The pocket shroud wall 314 forms the pocket 320. The pocket shroud wall 314 is spaced apart from the receptacle cage 110 to form the pocket 320. Optionally, the pocket shroud wall 314 may be oriented generally parallel to the corresponding cage wall of the receptacle cage 110. In an exemplary embodiment, the pocket shroud wall 314 is configured to engage the shield finger 220 to press the shield finger 220 inward toward the corresponding shielding wall 114 of the receptacle cage 110. In an exemplary embodiment, the pocket shroud wall 314 presses an inner surface of the shield finger 220 into physical engagement with the corresponding shielding walls 114 of the receptacle cage 110.

The base shroud wall 312 extends from the corresponding shielding wall 114 of the receptacle cage 110. In an exemplary embodiment, the shield finger shroud 300 is separate and discrete from the receptacle cage 110 and coupled thereto. Each base shroud walls 312 is connected to the corresponding shielding wall 114 of the receptacle cage 110. For example, the base shroud wall(s) 312 is connected to the shielding walls 114, such as being welded, soldered, adhered, or otherwise fixed to the shielding walls 114. In other various embodiments, the base shroud wall 312 may be riveted or secured using fasteners, such as threaded fasteners. The base shroud walls 312 may be latched or clipped to the shielding wall 114 in alternative embodiments. In alternative embodiments, the shield finger shroud 300 may be integral with the receptacle cage 110, such as being stamped and formed from the corresponding shielding walls 114

In the illustrated embodiment, the shield finger shroud 300 includes a plurality of base shroud walls 312, such as a rear shroud wall 316, a first side shroud wall 317, and a second side shroud wall 318. The rear shroud walls 316 is located rearward of the pocket shroud wall 314. The base shroud walls 316, 317, 318 surround the pockets 320 on three sides. The pocket shroud walls 314 surrounds the pocket 320 on a fourth side, while the corresponding shielding wall 114 is provided along a fifth side of the pocket 320. The sixth side includes an opening 324 at the front 322. The opening 324 provides access to the pocket 320. The distal ends 224 of the shield finger 220 is received in the opening 324 such that the distal ends 224 is surrounded by the base shroud walls 316, 317, 318 and the pocket shroud wall 314.

In various embodiments, the base shroud walls 316, 317, 318 extend generally perpendicular to the corresponding shielding wall 114 of the receptacle cage 110. However, the base shroud walls 316, 317, 318 may include mounting tabs extending therefrom generally parallel to and seated on the corresponding shielding wall 114 of the receptacle cage 110. The mounting tabs may provide a larger surface area for mounting the base shroud walls 316, 317, 318 to the shielding walls 114 of the receptacle cage 110.

In various embodiments, the pocket shroud wall 314 is connected to each of the base shroud walls 316, 317, 318 to form a rigid box shaped enclosure configured to receive the distal end 224 of the shield finger 220. However, in alternative embodiments, the pocket shroud walls 314 may be separated from at least one of the base shroud walls 316, 317, 318 to allow the pocket shroud wall 314 to move relative to such base shroud wall 316, 317, 318. For example, the pocket shroud wall 314 may be deflectable and configured to be spring biased against the shield finger 220 when the distal end 224 of the shield finger 220 is received in the pocket 320.

Figure 6:
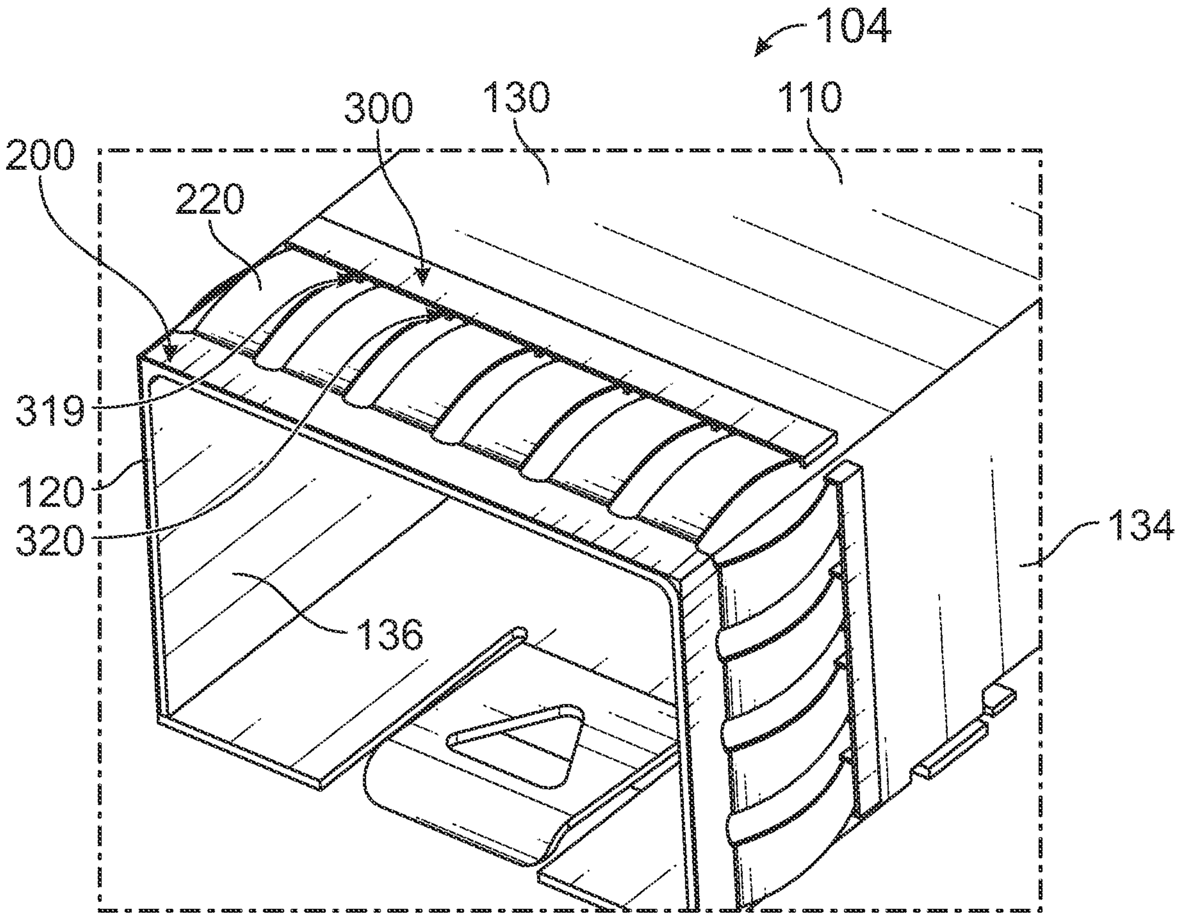
FIG. 6 is a perspective view of a portion of the receptacle connector assembly in accordance with an exemplary embodiment showing the front end of the receptacle cage, the EMI shield, and the shield finger shrouds.

FIG. 6 is a perspective view of a portion of the receptacle connector assembly 104 in accordance with an exemplary embodiment showing the front end 120 of the receptacle cage 110, the EMI shield 200, and the shield finger shrouds 300. In the illustrated embodiment, the shield finger shrouds 300 are elongated and each configured to receive a plurality of the shield fingers 220. For example, a single shield finger shroud 300 is provided along the top wall 130, a single shield finger shroud 300 is provided along the first side wall 134, and a single shield finger shroud 300 is provided along the second side wall 136. In the illustrated embodiment, the shield finger shrouds 300 includes separating walls 319 defining a plurality of pockets 320. The separating walls 319 are located in the gaps between the shield fingers 220. However, in alternative embodiments, the shield finger shrouds 300 may be provided without the separating walls 319 such that a plurality of the shield fingers 220 are received in a common pocket 320.

Figure 7:
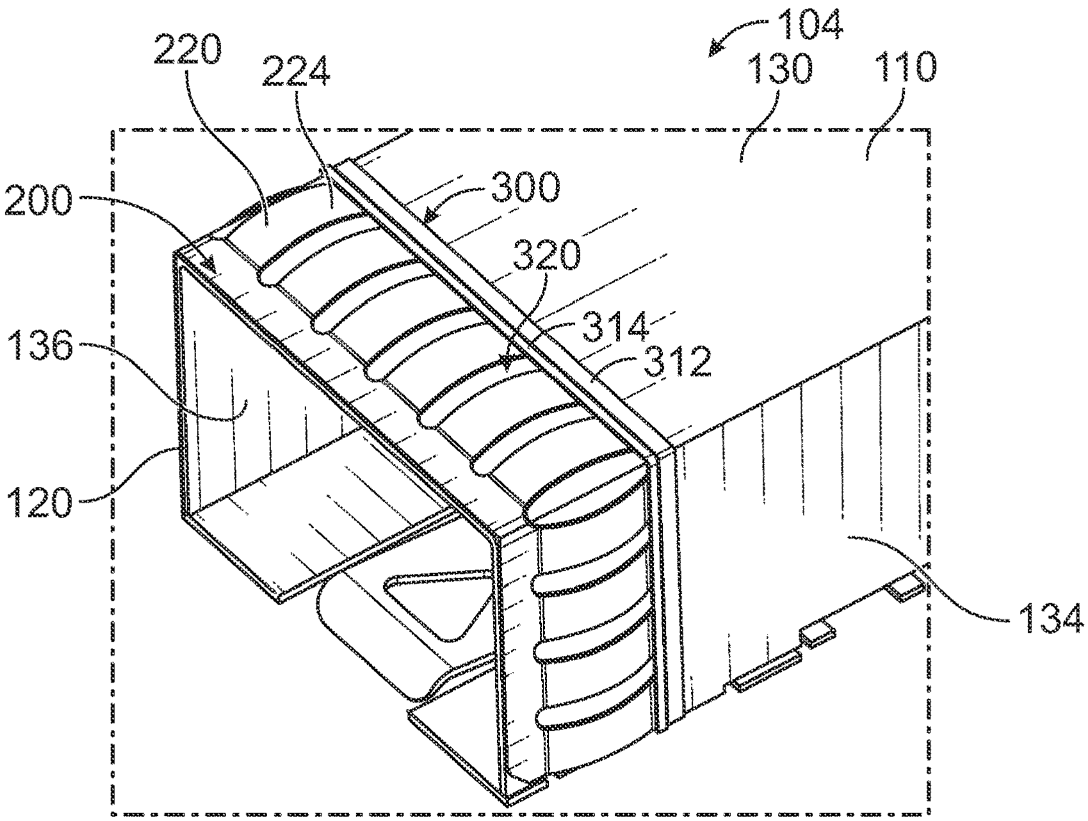
FIG. 7 is a perspective view of a portion of the receptacle connector assembly in accordance with an exemplary embodiment showing the front end of the receptacle cage, the EMI shield, and the shield finger shroud.

FIG. 7 is a perspective view of a portion of the receptacle connector assembly 104 in accordance with an exemplary embodiment showing the front end 120 of the receptacle cage 110, the EMI shield 200, and the shield finger shroud 300. In the illustrated embodiment, a single shield finger shroud 300 is provided that extends along the top wall 130, the first side wall 134, and the second side wall 136. The shield finger shroud 300 receives the distal ends 224 of each of the shield fingers 220.

The shield finger shroud 300 includes a continuous base shroud wall 312 that extends along the first side wall 134, the top wall 130, and the second side wall 136. The shield finger shroud 300 includes a continuous pocket shroud wall 314 that extends along the first side wall 134, the top wall 130, and the second side wall 136. The pocket shroud wall 314 is flared outward relative to the base shroud walls 312 to form the pocket 320 at the front of the shield finger shroud 300. The pocket shroud wall 314 forces the shield fingers 220 inward into engagement with the receptacle cage 110. The base shroud wall 312 is located rearward of the pocket shroud walls 314. The base shroud wall 312 may be secured to the receptacle cage 110 by welding, soldering or adhering the base shroud wall 312 to the receptacle cage 110.

Figure 8:
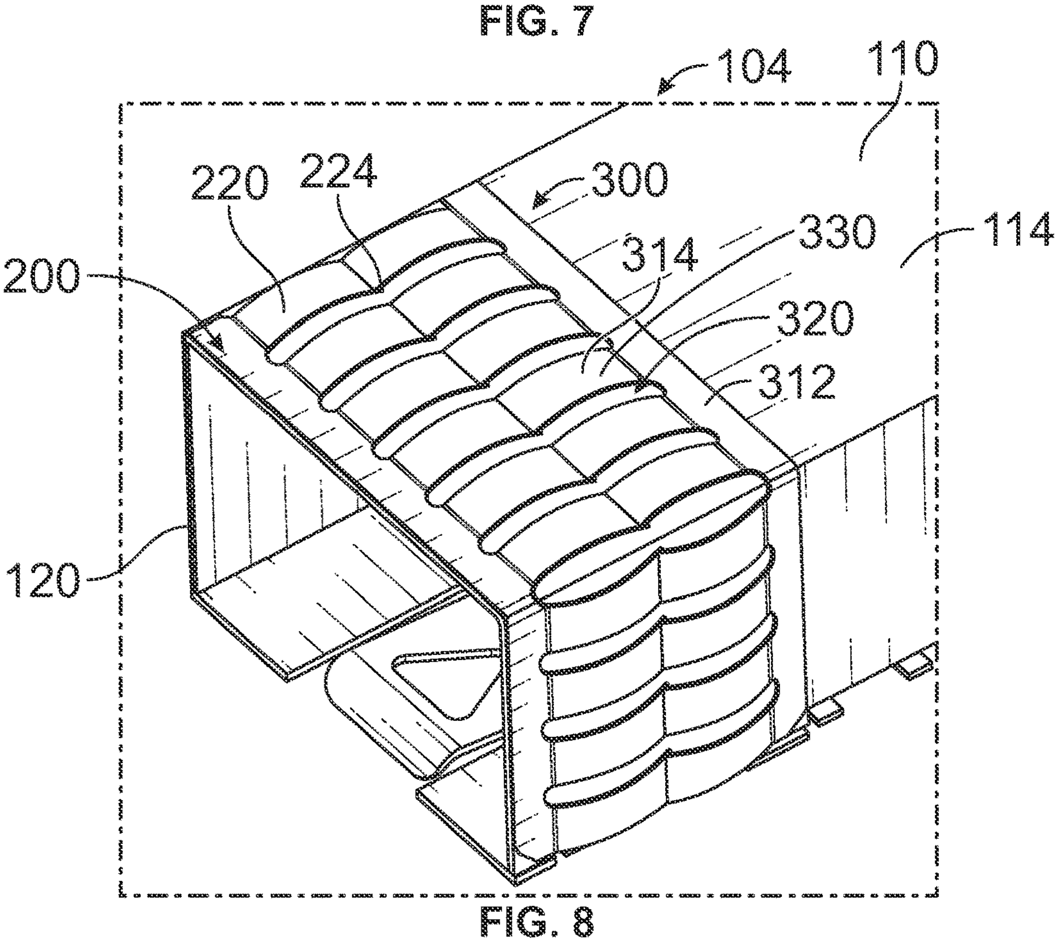
FIG. 8 is a perspective view of a portion of the receptacle connector assembly in accordance with an exemplary embodiment showing the front end of the receptacle cage, the EMI shield, and the shield finger shroud.

FIG. 8 is a perspective view of a portion of the receptacle connector assembly 104 in accordance with an exemplary embodiment showing the front end 120 of the receptacle cage 110, the EMI shield 200, and the shield finger shroud 300. In an exemplary embodiment, the shield finger shroud 300 includes a plurality of spring beams 330 that engage the shield fingers 220 of the EMI shield 200 to hold down the shield fingers 220 into direct physical contact with the receptacle cage 110.

The shield finger shroud 300 includes the base shroud wall 312 and the pocket shroud walls 314 that extend from the base shroud wall 312. The pocket shroud walls 314 form the pockets 320 that receive the distal ends 224 of the shield fingers 220. In an exemplary embodiment, the spring beams 330 define the pocket shroud walls 314. For example, the pockets 320 are located between the spring beams 330 and the shielding walls 114 of the receptacle cage 110. The spring beams 330 are independently movable relative to each other to allow independent engagement with the corresponding shield fingers 220. The pocket shroud walls 314 defined by the spring beams 330 are deflectable and configured to engage the outer surfaces of the corresponding shield fingers 220. The spring beams 330 press the shield fingers 220 inward toward the corresponding shielding wall 114 of the receptacle cage 110.

In the illustrated embodiment, the shield finger shroud 300 is identical (a common stamped and formed part) to the EMI shield 200. However, the shield finger shroud 300 is mounted to the receptacle cage 110 such that the spring beams 330 extend forwardly, whereas the shield fingers 220 extend rearwardly.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A receptacle connector assembly comprising:

a receptacle cage having shielding walls extending between a front end and a rear end of the receptacle cage, the shielding walls including a top wall, a first side wall extending from the top wall to a bottom of the receptacle cage, and a second side wall extending from the top wall opposite the first side wall to the bottom of the receptacle cage, wherein the top wall, the first side wall and the second side wall form a module channel configured to receive a pluggable module, the front end having a port open to the pluggable module to receive the pluggable module; and an EMI shield coupled to the receptacle cage at the front end, the EMI shield having a shield member including a base coupled to at least one of the shielding walls to electrically connect the EMI shield to the receptacle cage, the shield member including shield fingers extending from the base to distal ends;

a shield finger shroud extending outward from the receptacle cage, the shield finger shroud including a pocket outward of the corresponding shielding wall receiving the distal end of the corresponding shield finger.

2. The receptacle connector assembly of claim 1, wherein the shield finger shroud is a first shield finger shroud of a plurality of shield finger shrouds receiving the corresponding shield fingers.

3. The receptacle connector assembly of claim 2, wherein the shield fingers are located along the top wall, the first side wall, and the second side wall, the shield finger shrouds being provided along the top wall, the first side wall, and the second side wall.

4. The receptacle connector assembly of claim 1, wherein the shield finger shroud presses the distal end of the corresponding shield finger into physical engagement with the receptacle cage.

5. The receptacle connector assembly of claim 1, wherein the shield finger shroud includes an opening at a front of the shield finger shroud receiving the corresponding shield finger.

6. The receptacle connector assembly of claim 1, wherein the pocket of the shield finger shroud receives a plurality of the shield fingers.

7. The receptacle connector assembly of claim 1, wherein the shield finger shroud is separate and discrete from the receptacle cage and coupled thereto, the shield finger shroud being one of welded, soldered, or adhered to the receptacle cage.

8. The receptacle connector assembly of claim 1, wherein the shield finger shroud includes shroud walls forming the pocket, the shroud walls including a base shroud wall coupled to the receptacle cage and a pocket shroud wall forming the pocket, the pocket shroud wall being located a first distance from the receptacle cage, the distal end of the shield finger located between the pocket shroud wall and the receptacle cage.

9. The receptacle connector assembly of claim 8, wherein the base shroud wall includes a band surrounding the receptacle cage.

10. The receptacle connector assembly of claim 8, wherein the base shroud wall includes a top portion extending along the top wall, a first portion extending along the first side wall, and a second portion extending along the second side wall.

11. The receptacle connector assembly of claim 8, wherein the base shroud wall is located rearward of the pocket shroud wall.

12. The receptacle connector assembly of claim 1, wherein the shield finger shroud is formed from the receptacle cage.

13. The receptacle connector assembly of claim 1, wherein the shield finger shroud includes shroud walls forming the pocket, the shroud walls including a base shroud wall coupled to the receptacle cage and a pocket shroud wall forming the pocket, the pocket shroud wall being spring biased toward the receptacle cage, the pocket shroud walls engaging the corresponding shield finger to press the distal end of the shield finger into engagement with the receptacle cage.

14. The receptacle connector assembly of claim 13, wherein the pocket shroud wall is deflectable and configured to engage an outer surface of the shield finger compress the shield finger inward into engagement with the receptacle cage.

15. The receptacle connector assembly of claim 13, wherein the pocket shroud wall is one of a plurality of pocket shroud walls extending from the base shroud walls to interface with the corresponding shield fingers.

16. A receptacle connector assembly comprising:

a receptacle cage having shielding walls extending between a front end and a rear end of the receptacle cage, the shielding walls including a top wall, a first side wall extending from the top wall to a bottom of the receptacle cage, and a second side wall extending from the top wall opposite the first side wall to the bottom of the receptacle cage, wherein the top wall, the first side wall and the second side wall form a module channel configured to receive a pluggable module, the front end having a port open to the pluggable module to receive the pluggable module; and an EMI shield coupled to the receptacle cage at the front end, the EMI shield having a shield member including a base coupled to at least one of the shielding walls to electrically connect the EMI shield to the receptacle cage, the shield member including shield fingers extending from the base to distal ends;

a shield finger shroud extending outward from the receptacle cage, the shield finger shroud including shroud walls forming a pocket outward of the corresponding shielding wall, the shroud walls including a base shroud wall coupled to the receptacle cage and a pocket shroud wall forming the pocket, the pocket shroud wall being fixed at a first distance from the receptacle cage to form the pocket therebetween, the pocket receiving the distal end of the corresponding shield finger.

17. The receptacle connector assembly of claim 16, wherein the shield finger shroud presses the distal end of the corresponding shield finger into physical engagement with the receptacle cage.

18. The receptacle connector assembly of claim 16, wherein the base shroud wall includes a top portion extending along the top wall, a first portion extending along the first side wall, and a second portion extending along the second side wall.

19. A receptacle connector assembly comprising:

a receptacle cage having shielding walls extending between a front end and a rear end of the receptacle cage, the shielding walls including a top wall, a first side wall extending from the top wall to a bottom of the receptacle cage, and a second side wall extending from the top wall opposite the first side wall to the bottom of the receptacle cage, wherein the top wall, the first side wall and the second side wall form a module channel configured to receive a pluggable module, the front end having a port open to the pluggable module to receive the pluggable module; and an EMI shield coupled to the receptacle cage at the front end, the EMI shield having a shield member including a base coupled to at least one of the shielding walls to electrically connect the EMI shield to the receptacle cage, the shield member including shield fingers extending from the base to distal ends;

a shield finger shroud extending outward from the receptacle cage, the shield finger shroud including shroud walls forming a pocket outward of the corresponding shielding wall receiving the distal end of the corresponding shield finger, the shroud walls including a base shroud wall coupled to the receptacle cage and a pocket shroud wall forming the pocket, the pocket shroud wall being spring biased toward the receptacle cage, the pocket shroud wall engaging the corresponding at least one of the shield fingers to press the distal end of the corresponding at least one of the shield fingers into engagement with the receptacle cage.

20. The receptacle connector assembly of claim 19, wherein the pocket shroud wall is deflectable and configured to engage an outer surface of the shield finger compress the shield finger inward into engagement with the receptacle cage.

* * * * *